United States Patent [19]

Phinney

[11] Patent Number: 4,731,027

[45] Date of Patent: Mar. 15, 1988

[54] EDUCATIONAL TEACHING TOY

[75] Inventor: Raymond C. Phinney, East Aurora, N.Y.

[73] Assignee: The Quaker Oats Company, Chicago, Ill.

[21] Appl. No.: 920,695

[22] Filed: Oct. 17, 1986

[51] Int. Cl.$^4$ .............................................. G09B 3/00
[52] U.S. Cl. ................................... 434/348; 434/169; 434/344
[58] Field of Search ............... 434/344, 348, 167, 169, 434/311, 312, 313

[56] References Cited

U.S. PATENT DOCUMENTS

| | | | |
|---|---|---|---|
| 2,092,577 | 9/1937 | Hornung | 434/344 |
| 3,199,228 | 8/1965 | Rubin | 434/167 |
| 3,729,836 | 5/1973 | Mayeda | 434/169 X |
| 4,573,928 | 3/1986 | Seki | 434/348 |

Primary Examiner—William H. Grieb
Attorney, Agent, or Firm—Cumpston & Shaw

[57] ABSTRACT

An educational teaching toy for teaching a child the names of various objects. The toy comprises a card holder for holding a card having a visible picture of an object, and adjacent thereto aligned spaced-apart letters defining the name of the object. A slider covers the name, and if the child does not know the name of the object, the slider can be moved in increments across the name from one end thereof to the other to expose the letters one at a time to assist the child to identify the object. A double sided laminated card having letters that are visible only when the card is back-lit is also described.

18 Claims, 9 Drawing Figures

EDUCATIONAL TEACHING TOY

BACKGROUND OF THE INVENTION

1. Field of the Invention

This invention relates generally to toys, and more particularly to an educational teaching toy to assist a child to learn the names of various objects.

2. Description of the Prior Art

Educational teaching toys or tools for use in teaching children are well known in the art. For example, flash cards with objects, words, or mathematical figures thereon to assist a child in the learning process are well known. In the case of a flash card with objects thereon, if the child cannot recognize or does not know the object, no means are provided to give the child a hint of the answer by letting him see the first letter of the name of the object, for example. This problem is solved by the present invention by providing a means hiding the name and for disclosing the name, one letter at a time, to assist the child in recognizing and knowing the object.

SUMMARY OF THE INVENTION

An object of the present invention is to provide an educational teaching toy comprising:

a card holder for holding a card having a visible picture thereon of an object, the card further having aligned spaced apart letters adjacent the object for defining the name of the object; and a slider for covering the name, the slider being slidably movable in increments across the name from one end thereof to the other to expose the letters one at a time to assist the child to identify the object.

A more specific object of the invention is to provide a card having a name that is invisible until back-lit and an illuminating means for illuminating the name so that the name and letters thereof are readily visible to the child, and to provide a detent means for releasably engaging and stopping the slider after each letter is uncovered.

The invention and its advantages will become more apparent from the detailed description of the invention presented below.

BRIEF DESCRIPTION OF THE DRAWINGS

In the detailed description of the invention presented below, reference is made to the accompanying drawings, in which.

DETAILED DESCRIPTION OF THE INVENTION

Figure 1:
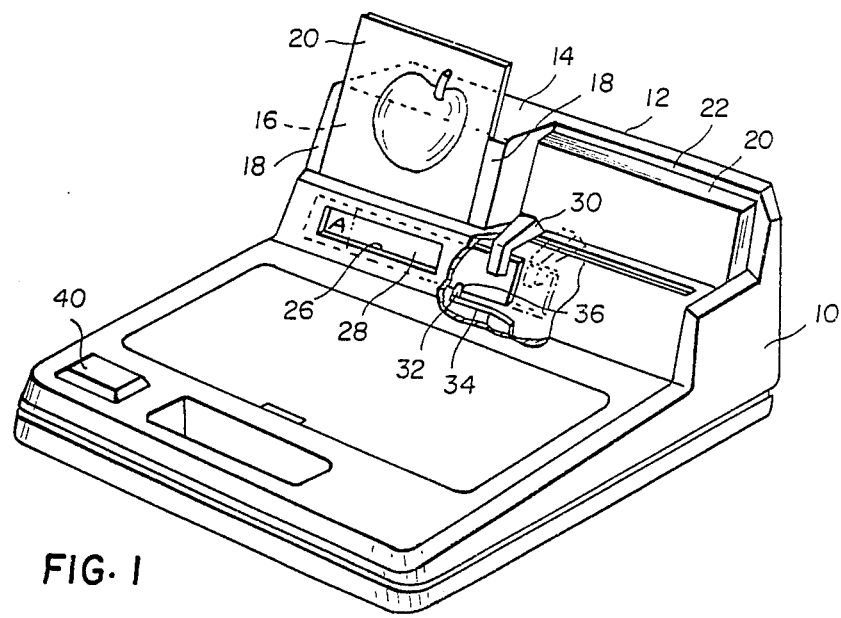
FIG. 1 is a perspective view of a preferred embodiment of the educational teaching toy of this invention with a portion thereof broken away for purposes of clarity.
Figure 2:
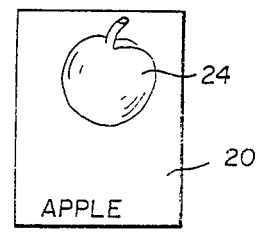
FIG. 2 is a front elevation view of a card of the type used in this invention.

Referring now to FIG. 1 of the drawings, a preferred embodiment of the educational teaching toy of this invention comprises a streamlined housing 10 generally simulating a known type of office equipment, such as a typewriter or computer keyboard. The rear upstanding portion 12 of the housing 10 has a card holder 14 comprising a card supporting surface 16 having parallel spaced-apart ribs 18 on the surface to form a guideway for insertion of a card 20 into the card holder. The rear portion 12 further has a card storage compartment 22 for storing cards 20. Each card is of the type shown in FIG. 2 having an object 24 such as an apple shown thereon, and below the object letters spelling the name of the object. At the lower end of card holder 14, housing 10 has an aperture 26 in register with the name of the object when the card is fully inserted into the card holder. The housing 10 further slidably supports a flat slider 28 which covers or blocks the aperture so that the name of the object is not visible. The slider 28 is in the closed position when a card 20 is inserted into the card holder for viewing by the child. If the child cannot remember the name of the object 24, slider 28 is moved by handle 30 integral with one end thereof to the right exposing the first letter of the object. If the child still does not recognize object 24, slider 28 is moved further to the right uncovering the second letter of the object. This is continued until the child recognizes the object. To assist holding slider 28 in any of its moved positions, a detent can be provided such as a pin 32 mounted on a spring 34 on housing 10 engagable with spaced notches 36, only one of which is shown, along an edge of the slider.

Figure 4:
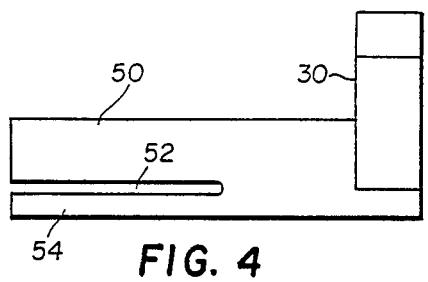
FIG. 4 is a front elevation of a slider in accordance with an alternative embodiment of this invention.
Figure 5:
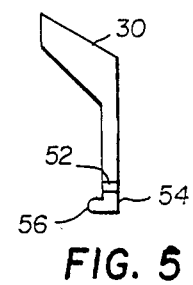
FIG. 5 is a left side elevation of the slider of FIG. 4.
Figure 6:
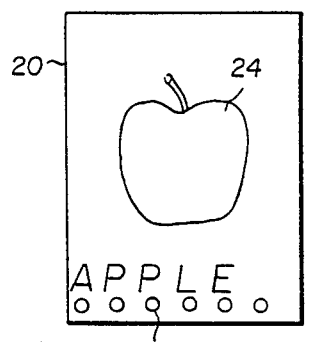
FIGS. 6-8 are front elevations of cards in accordance with alternative embodiments of the invention.
Figure 7:
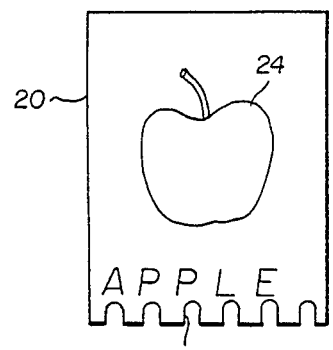

Referring now to FIG. 4 an alternative slider 50 in accordance with another embodiment of the invention is shown having a lateral slot 52 cut in the lower portion of the slider and forming an elongated resilient finger 54. A rounded pin 56 projects from the end of finger 54 for engaging one of a series of holes 58 or notches 60 formed adjacent the bottom edge of card 20 as illustrated in FIG. 6 and 7. One hole or notch is provided for each letter in the name of the object for allowing only one letter at a time to be uncovered.

Figure 8:
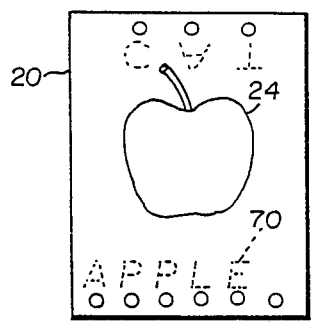

In accordance with another embodiment of this invention, the identifying words on card 20 are rendered invisible except when the card is back lit. As shown in FIG. 8, card 20 has the image of the object 24 printed on one side thereof and the letters forming the name of the object printed in reverse on the opposite side of the card, so that they are not normally visible. Preferably, the letters are printed in silhouette, that is light letters on a dark background. When the card is illuminated from the rear the letters become visible and may be progressively revealed by moving slider 28.

Figure 9:
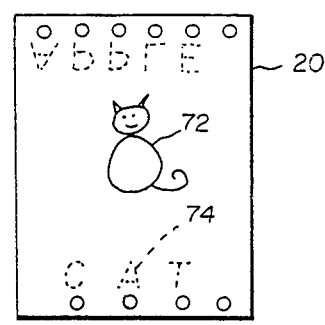
FIG. 9 is a rear elevation of the card of FIG. 8.

In accordance with a still further embodiment of the invention, two images are formed on a single card, one on the front and one on the back. Preferably, such a two image card is formed by laminating two thin cards, each of which has an image of an article printed on one side thereof and the name of the article printed in reverse on the opposite side. Preferably, as shown in FIGS. 8 and 9, the image 24 and word 70 on one side of the laminated card are upside down with respect to the image 72 and the word 74 on the other side. The word bearing faces of the cards are disposed adjacent to each other and the cards are laminated to form a single card having a picture of one object on one side and other object on the other side. Neither of the words is visible until the card is illuminated from the back. Preferably, when such cards are used in the apparatus shown in FIGS. 1 and 3, only the word corresponding to the article on the front of the card is illuminated.

Figure 3:
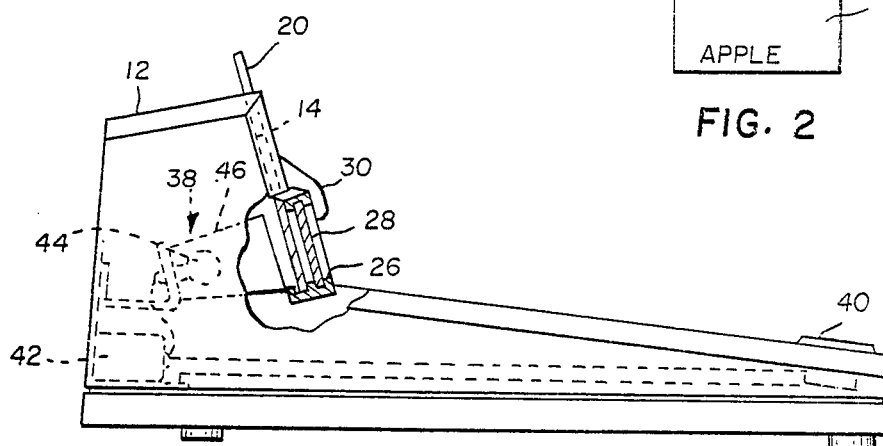
FIG. 3 is a side elevation view of the educational teaching toy of this invention with a portion thereof broken away.

With reference to FIG. 3, an illuminating means 38 is shown mounted within housing 10 for illuminating the letters upon depression of push button 40. Pressing the push button closes a switch, not shown, for connecting a power supply, shown as a battery 42, to a lamp 44. The lamp light is guided by a reflector 46 through the aperture 26 for illuminating the name of any card 20 that is in card holder 14.

While a preferred embodiment of the invention has been shown and described with particularity, it will be appreciated that various changes and modifications may suggest themselves to one having ordinary skill in the art on being apprised of the present invention. It is intended to encompass all such changes and modifications as fall within the scope and spirit of the appended claims.

What is claimed is:

1. An educational teaching toy comprising:
   a card holder for holding a card having a visible picture thereon of an object, the card further having aligned spaced-apart letters adjacent the object for defining the name of the object; and
   a slider for covering the name, having a plate at one end for covering the name, and a handle at the opposite end by which the slider can be moved in increments across the name from one end thereof to the other and detent means for releasably engaging and stopping the slider after each letter is uncovered to expose the letters one at a time to assist the child to identify the object.

2. An educational teaching toy according to claim 1 wherein the detent means comprises spaced-apart notches along one edge of the slider engagable by a spring biased pin on the holder.

3. An educational teaching toy according to claim 2, and further comprising an illuminating means for illuminating the name so that the name and letters thereof are readily visible to the child.

4. The educational toy of claim 3 comprising a card having an image formed on one surface thereof and a word formed on said card so as to be visible only when said card is back-lit.

5. The educational toy of claim 4 wherein said card has said word printed in reverse on the opposite side of said card as the side on which the image is printed.

6. The educational toy of claim 5 wherein said card comprises two plies, each having an image on one side and a word on the other side and said two plies are laminated to form a card having images on both sides and hidden word corresponding to each image.

7. The educational toy of claim 6 wherein said words are positioned below said images and said plies are laminated with one image upside-down with respect to the other.

8. The educational toy of claim 1 wherein said detent means comprises resilient means on said slider adapted to project into indentations in the card for positioning said slider to uncover one of said letters at a time.

9. The educational toy of claim 8 wherein said indentations are holes formed adjacent the lower edge of said card.

10. The educational toy of claim 8 wherein said resilient means comprises a longitudinal slot adjacent the lower edge of the slider for forming a resilient finger and a projecting pin on the end of said finger extending towards said card for engaging said indentations.

11. An educational teaching toy comprising:
    a card holder for holding a card having a visible image thereon, the card further having aligned spaced apart characters adjacent the image and related thereto;
    a slider for covering the characters, the slider being movable to expose one or more of the characters at a time;
    illuminating means disposed behind a card holder for backlighting the portion of the card having the characters thereon; and switch means for selectively energizing said illuminating means.

12. The educational teaching toy of claim 11 further comprising a card having an image formed on one side and characters formed on said card so as to be visible only when said card is back-lit.

13. The educational teaching toy of claim 12 wherein said card has said word printed in reverse on the opposite side of said card as the side on which the image is printed.

14. The educational teaching toy of claim 13 wherein said card comprises two plies, each having an image on one side and a word on the other side and said two plies are laminated to form a card having images on both sides and hidden word corresponding to each image.

15. The educational teaching toy of claim 14 wherein said words are positioned below said images and said plies are laminated with one image upside-down with respect to the other.

16. An educational teaching toy according to claim 11, and further comprising detent means for releasably engaging and stopping the slider after each letter is uncovered.

17. A card for use with an educational teaching toy having a cardholder and means selectively back lighting a portion of the card comprising:
    two plies, each having an image on one side and indicia on the other side, said indicia printed in reverse on the opposite side of said card as the side on which the image is printed, and said two plies are laminated to form a card having images on both sides and hidden indicia corresponding to each image, so as to be visible only when said card is back lit.

18. The card of claim 17 wherein said indicia are positioned below said images and said plies are laminated with one image upside-down with respect to the other.

* * * * *